United States Patent
Corrado et al.

(10) Patent No.: US 11,954,597 B2
(45) Date of Patent: *Apr. 9, 2024

(54) USING EMBEDDING FUNCTIONS WITH A DEEP NETWORK

(71) Applicant: Google LLC, Mountain View, CA (US)

(72) Inventors: Gregory S. Corrado, San Francisco, CA (US); Kai Chen, San Bruno, CA (US); Jeffrey A. Dean, Palo Alto, CA (US); Gary R. Holt, Murrysville, PA (US); Julian P. Grady, Pittsburgh, PA (US); Sharat Chikkerur, Pittsburgh, PA (US); David W. Sculley, II, Pittsburgh, PA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/972,466

(22) Filed: Oct. 24, 2022

(65) Prior Publication Data
US 2023/0325657 A1 Oct. 12, 2023

Related U.S. Application Data

(63) Continuation of application No. 16/895,855, filed on Jun. 8, 2020, now Pat. No. 11,481,631, which is a
(Continued)

(51) Int. Cl.
*G06N 3/08* (2023.01)
*G06F 7/483* (2006.01)
(Continued)

(52) U.S. Cl.
CPC ............... *G06N 3/08* (2013.01); *G06F 7/483* (2013.01); *G06F 17/16* (2013.01); *G06N 3/04* (2013.01);
(Continued)

(58) Field of Classification Search
CPC .......... G06N 3/04; G06N 3/0454; G06N 3/08; G06N 3/084; G06N 5/025; G06N 99/00;
(Continued)

(56) References Cited

U.S. PATENT DOCUMENTS 7,428,524 B2 9/2008 Burrows
7,548,928 B1 6/2009 Dean
(Continued)

OTHER PUBLICATIONS

Bottou, Léon, et al. "Scaling learning algorithms toward AI." (2007): 321-359 (Year: 2007).*
(Continued)

*Primary Examiner* — Kamran Afshar
*Assistant Examiner* — Randall K. Baldwin
(74) *Attorney, Agent, or Firm* — Fish & Richardson P.C.

(57) ABSTRACT

Methods, systems, and apparatus, including computer programs encoded on computer storage media, for using embedded function with a deep network. One of the methods includes receiving an input comprising a plurality of features, wherein each of the features is of a different feature type; processing each of the features using a respective embedding function to generate one or more numeric values, wherein each of the embedding functions operates independently of each other embedding function, and wherein each of the embedding functions is used for features of a respective feature type; processing the numeric values using a deep network to generate a first alternative representation of the input, wherein the deep network is a machine learning model composed of a plurality of levels of non-linear operations; and processing the first alternative representation of the input using a logistic regression classifier to predict a label for the input.

20 Claims, 4 Drawing Sheets

Related U.S. Application Data continuation of application No. 15/368,460, filed on Dec. 2, 2016, now Pat. No. 10,679,124, which is a continuation of application No. 14/860,497, filed on Sep. 21, 2015, now Pat. No. 9,514,404, which is a continuation of application No. 13/803,779, filed on Mar. 14, 2013, now Pat. No. 9,141,916.

(60) Provisional application No. 61/666,684, filed on Jun. 29, 2012.

(51) Int. Cl.
| | |
|---|---|
| *G06F 17/16* | (2006.01) |
| *G06N 3/04* | (2023.01) |
| *G06N 3/045* | (2023.01) |
| *G06N 3/084* | (2023.01) |

(52) U.S. Cl.
CPC ............. *G06N 3/045* (2023.01); *G06N 3/084* (2013.01); *G06F 2207/483* (2013.01)

(58) Field of Classification Search
CPC ...... G06N 99/005; G06N 7/005; G06N 3/045; G06F 7/483; G06F 17/16; G06F 2207/483; G06F 19/70; G06F 19/709; G06F 15/00; G06F 15/15; G06F 15/18; G06F 15/76; G06F 2015/761–2015/768; G06K 9/6255; G06K 9/6268
See application file for complete search history.

(56) References Cited

U.S. PATENT DOCUMENTS

| | | | | |
|---|---|---|---|---|
| 7,567,973 | B1 | 7/2009 | Burrows | |
| 7,624,074 | B2* | 11/2009 | Weston | G06N 20/00 706/1 |
| 7,661,128 | B2 | 2/2010 | Chen | |
| 7,689,006 | B2 | 3/2010 | Govindaraju et al. | |
| 8,234,228 | B2* | 7/2012 | Weston | G06N 3/08 706/20 |
| 8,484,351 | B1 | 7/2013 | Dean | |
| 8,489,529 | B2 | 7/2013 | Deng et al. | |
| 8,768,870 | B1* | 7/2014 | Corrado | G06N 7/08 706/12 |
| 8,799,202 | B2* | 8/2014 | Carroll | G16H 50/50 706/46 |
| 9,141,906 | B2 | 9/2015 | Chen | |
| 9,141,916 | B1* | 9/2015 | Corrado | G06N 3/084 |
| 9,147,154 | B2 | 9/2015 | Wang | |
| 9,218,573 | B1 | 12/2015 | Corrado | |
| 9,514,404 | B1* | 12/2016 | Corrado | G06N 3/084 |
| 10,679,124 | B1* | 6/2020 | Corrado | G06F 7/483 |
| 11,481,631 | B1* | 10/2022 | Corrado | G06N 3/08 |
| 2006/0078171 | A1 | 4/2006 | Govindaraju et al. | |
| 2007/0217676 | A1* | 9/2007 | Grauman | G06V 10/764 382/190 |
| 2009/0204558 | A1* | 8/2009 | Weston | G06F 18/2137 706/20 |
| 2011/0123100 | A1* | 5/2011 | Carroll | G06N 5/01 382/238 |
| 2012/0143797 | A1* | 6/2012 | Wang | G06N 20/00 706/12 |
| 2014/0279773 | A1 | 9/2014 | Chen et al. | |
| 2014/0279774 | A1 | 9/2014 | Wang et al. | |

OTHER PUBLICATIONS

Kulis, Brian, and Trevor Darrell. "Learning to hash with binary reconstructive embeddings." Advances in neural information processing systems 22 (2009). (Year: 2009).*

Socher, Richard, Christopher D. Manning, and Andrew Y. Ng. "Learning continuous phrase representations and syntactic parsing with recursive neural networks." Proceedings of the NIPS-2010 deep learning and unsupervised feature learning workshop. Vol. 2010. 2010. (Year: 2010).*

Bengio, Samy, Jason Weston, and David Grangier. "Label embedding trees for large multi-class tasks." Advances in neural information processing systems 23 (2010). (Year: 2010).*

Xu, Zhixiang Eddie, Kilian Q. Weinberger, and Fei Sha. "Rapid feature learning with stacked linear denoisers." arXiv preprint arXiv: 1105.0972 (2011): 1-10 (Year: 2011).*

Ajemba et al., "A support vectors classifier approach to predicting the risk of progression of adolescent idiopathic scoliosis," IEEE Transactions on Information Technology in Biomedicine, Jun. 2005, 9(2): 276-282, DOI: 10.1109/TITB.2005.847169.

Bengio et al., "A Neural Probabilistic Language Model," J Machine Learning Research, 2003, 3:1137-1155.

Collobert and Weston, "A Unified Architecture for Natural Language Processing: Deep Neural Networks with Multitask Learning," Proceedings of the 25th International Conference of Machine Learning, Helsinki Finland, 2008, 8 pages.

de Toledo et al., "Predicting the Outcome of Patients With Subarachnoid Hemorrhage Using Machine Learning Techniques," IEEE Transactions on Information Technology in Biomedicine, Sep. 2009, 13(5):794-801, DOI: 10.1109/TITB.2009.2020434.

Liu et al., "Fast Traffic Sign Recognition via High-Contrast Region Extraction and Extended Sparse Representation," IEEE Transactions on Intelligent Transportation Systems, Jan. 2016, 17(1):79-92, DOI: 10.1109/TITS.2015.2459594.

Meidan et al., "Cycle-Time Key Factor Identification and Prediction in Semiconductor Manufacturing Using Machine Learning and Data Mining," IEEE Transactions on Semiconductor Manufacturing, Feb. 2011, 24(2): 237-248, DOI: 10.1109/TSM.2011.2118775.

Saeed et al., "Classifiers based on Bernoulli mixture models for text mining and handwriting recognition tasks," 2008 IEEE International Joint Conference on Neural Networks (IEEE World Congress on Computational Intelligence), Jun. 2008, 2169-2175, DOI: 10.1109/IJCNN.2008.4634097.

Weston et al., "WSABIE: Scaling Up to Large Vocabulary Image Annotation," Proceedings of the 22nd International Joint Conference on Artificial Intelligence-Volume, AAAI Press, 2011, 3, 7 pages.

Xia et al., "Bottom-Up Visual Saliency Estimation With Deep Autoencoder-Based Sparse Reconstruction," IEEE Transactions on Neural Networks and Learning Systems, Jan. 2016, 27(6): 1227-1240, DOI: 10.1109/TNNLS.2015.2512898.

Yoon et al., "Performance Improvement of Bankruptcy Prediction using Credit Card Sales Information of Small & Micro Business," 5th ACIS International Conference on Software Engineering Research, Management & Applications (SERA 2007), Sep. 2007, 503-512, DOI: 10.1109/SERA.2007.105.

Zhang et al., "A document classification approach by GA feature extraction based corner classification neural network," 2005 International Conference on Cyberworlds (CW'05), 2005, 6 pages, DOI: 10.1109/CW.2005.3.

* cited by examiner

USING EMBEDDING FUNCTIONS WITH A DEEP NETWORK

CROSS-REFERENCE TO RELATED APPLICATIONS

This is a continuation of U.S. application Ser. No. 16/895,855, filed on Jun. 8, 2020 (now U.S. Pat. No. 11,481,631), which is a continuation of U.S. application Ser. No. 15/368,460, filed on Dec. 2, 2016 (now U.S. Pat. No. 10,679,124), which is a continuation of U.S. application Ser. No. 14/860,497, filed on Sep. 21, 2015 (now U.S. Pat. No. 9,514,404), which is a continuation of U.S. application Ser. No. 13/803,779, filed on Mar. 14, 2013 (now U.S. Pat. No. 9,141,916), which claims the benefit of priority under 35 U.S.C. § 119(e) of U.S. Provisional Application No. 61/666,684, filed on Jun. 29, 2012. The disclosures of the prior applications are considered part of and are incorporated by reference in the disclosure of this application.

BACKGROUND

This specification relates to machine learning models.

Machine learning models receive input and generate an output based on the received input and on values of the parameters of the model. Generally, a given machine learning model may be composed of, e.g., a single level of linear or non-linear operations or may be a deep network, i.e., a machine learning model that is composed of multiple levels of non-linear operations.

SUMMARY

In general, one innovative aspect of the subject matter described in this specification can be embodied in methods that include the actions of receiving an input comprising a plurality of features, wherein each of the features is of a different feature type; processing each of the features using a respective embedding function to generate one or more respective floating point vectors, wherein each of the embedding functions operates independently of each of the other embedding functions, and wherein each of the embedding functions is used for features of a respective feature type; processing the floating point vectors using a deep network to generate a first alternative representation of the input, wherein the deep network is a machine learning model composed of a plurality of levels of non-linear operations; and processing the first alternative representation of the input using a logistic regression classifier to predict a label for the input. Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method can further include: processing the plurality of features using a primary machine learning model to generate a second alternative representation of the input; and processing the second alternative representation of the input along with the first alternative representation of the input using the logistic regression classifier to predict the label for the input.

Each of the features includes one or more tokens. Each of the features is a sparse feature. At least one of the embedding functions is a simple embedding function that maps a single token to a floating point vector. At least one of the embedding functions is a parallel embedding function that maps each token in a list of tokens to a respective floating point vector and outputs a single vector that is a concatenation of the respective floating point vectors. At least one of the embedding functions is a combining embedding function that maps each token in a list of tokens to a respective floating point vector and outputs a single merged vector that is a combination of the respective floating point vectors. The merged vector is an output of a predetermined linear or nonlinear function of the respective floating point vectors. At least one of the embedding functions is a mixed embedding function that maps each token in a list of tokens to a respective floating point vector, generates an initial vector that is a concatenation of the respective floating point vectors, merges the respective floating point vectors into a merged vector, and concatenates the merged vector with the initial vector to generate a final vector.

In general, another innovative aspect of the subject matter described in this specification can be embodied in methods that include the actions of specifying initial values for parameters of a logistic regression classifier, wherein the logistic regression classifier receives a first alternative representation of an input from a deep learning system and a second alternative representation of the input from a primary machine learning model and predicts a label for the input, comprising: setting the initial value of a first parameter of the classifier that defines a weight assigned by the classifier to second alternative representations generated by the primary machine learning model equal to one and setting the initial value of a second parameter of the classifier that defines weights assigned by the classifier to first alternative representations generated by the deep learning network equal to zero; and initiating a training process for the logistic regression classifier based on the initial values and a set of training data, wherein the values of the first and second parameters of the logistic regression classifier are adjusted as part of the training process. Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. During the training process, values of parameters of the deep learning system are adjusted using a backpropagation method. The deep learning system includes a plurality of embedding functions and each of the plurality of embedding functions has a respective set of parameters. The deep learning system includes a deep network having a set of parameters.

Particular embodiments of the subject matter described in this specification can be implemented so as to realize one or more of the following advantages. A deep network can be effectively used to predict a label for an input that includes sparse, categorically distinct features. For example, the deep network can be used to effectively predict whether a user will select an online advertisement. A deep network can be effectively used in combination with an existing machine learning model to predict the label for the input. In particular, a deep network can be trained to improve upon the performance of the existing machine learning model in predicting labels for inputs.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
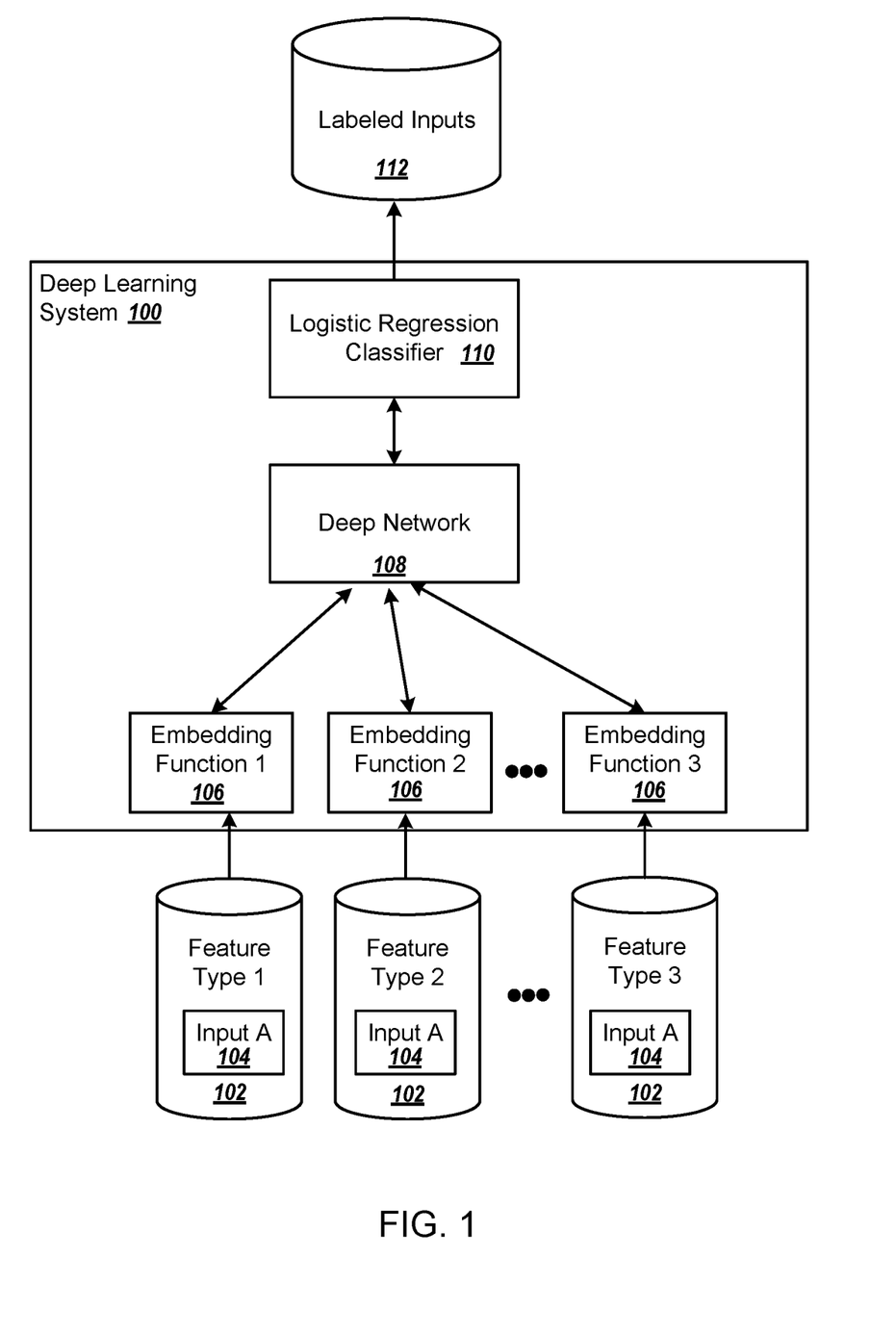
FIG. 1 is a block diagram of an example deep learning system.

FIG. 1 is a block diagram of an example deep learning system 100. The deep learning system 100 is an example of a system implemented as computer programs on one or more computers in one or more locations, in which the systems, components, and techniques described below can be implemented.

The deep learning system 100 receives an input and generates a predicted output based on the received input. The input includes a set of features, with each feature being of a respective categorically distinct feature type. A feature of a particular type is a list of active feature elements, i.e., a list of tokens or of token-value pairs, selected from a vocabulary of possible active feature elements of the feature type. For example, the tokens may be words in a natural language, e.g., English, and the vocabulary for the feature type may be the known words in the natural language. The vocabularies for the feature types may be overlapping or non-overlapping and the list for a given feature type may be ordered or unordered. Generally, each of the features is a sparse feature. A feature of a given type is sparse if it has a high likelihood of containing only a small subset of the possible tokens for that type. For example, if features of a particular feature type can potentially include any English word, a given feature will include only a very small subset of the possible values for that feature type, i.e., only one English word out of the entire set of English words.

For example, the deep learning system can receive a respective feature of an input A 104 from each of a set of feature type data stores 102. Each of the feature type data stores 102 stores a feature of input A 104 that is of a distinct type. For example, the input A 104 can identify a particular online advertisement presentation setting, and each of the features of the input can be a property of a distinct type of the advertisement presentation setting. For example, one of the features can be some or all of the words in the advertisement creative, another of the features can be some or all of the words in a search query submitted to a search engine by a user in response to which the advertisement may potentially be displayed, another of the features can be the country of origin of the search query, and so on.

The deep learning system 100 uses the received input features to predict a label for the input, e.g., to be stored in a labeled input data store 112, or to be used for some immediate purpose. In particular, the labeled input can be a predicted value for one or more binary variables. In the online advertising context, for example, where the input features are features of an online advertisement presentation setting, the deep learning system 100 can generate a prediction for whether or not a user will select, e.g., submit an input selecting, the advertisement if it is presented to the user. A user selection may be, e.g., a "click" on the advertisement with an input device, a touch input selecting the advertisement on a touchscreen device, or a selection made using any other suitable selection mechanism.

The machine learning system 100 includes a set of embedding functions 106, a deep network 108, and a logistic regression classifier 110. In some implementations, the embedding functions 106 are included in the deep network 108. Each of the embedding functions 106 receives a respective feature of a respective type and, in accordance with a set of parameters, applies a transformation to the feature that maps the feature into a numeric representation. For example, the numeric representations can be one or more floating point values or one or more quantized integer values whose encoding represents floating point values. Embedding functions will be described in more detail below with reference to FIG. 2.

The deep network 108 is a machine learning model that is composed of multiple levels of non-linear operations, with each level having a respective set of parameters. That is, the deep network 108 receives as an input the floating point representations of the input features generated by the embedding functions and applies one or more non-linear transformations to the floating point representations to generate an alternative representation of the input. For example, the deep network 108 may include one or more neural network layers that perform a respective nonlinear transformation on its input, a sparse binary output layer, or both. The logistic regression classifier 110 receives the alternative representation generated by the machine learning model and predicts the label for the input, i.e., determines the value of one or more binary values in accordance with values of parameters of the classifier.

Figure 2:
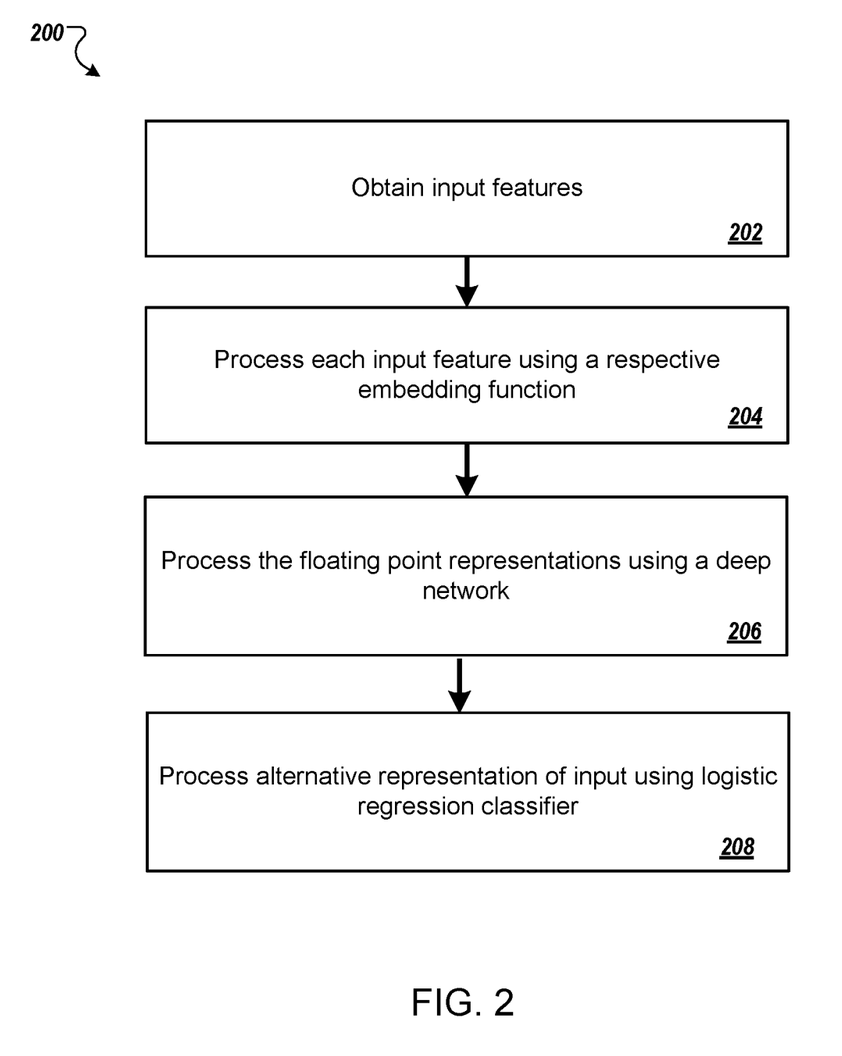
FIG. 2 is a flow diagram of an example process for generating a labeled input.

FIG. 2 is a flow diagram of an example process 200 for determining a label for a particular input. For convenience, the process 200 will be described as being performed by a system of one or more computers located in one or more locations. For example, a deep learning system, e.g., the deep learning system 100 of FIG. 1, appropriately programmed, can perform the process 200.

The system obtains features of an input (step 202). As described above, each of the features is of a different type and is either an ordered or unordered list of tokens or token-value pairs.

The system processes each feature using the embedded function for the feature type of the feature (step 204) to generate a floating-point vector representation of the feature.

Depending on the feature type and on the implementation, the embedding function for a given feature type can be any of a variety of embedding functions.

For example, for a feature type whose features consist of a single token, the embedding function may be a simple embedding function. A simple embedding function maps a single token to a floating point vector, i.e., a vector of floating point values. For example, the simple embedding function may map a token "cat" to a vector [0.1, 0.5, 0.2] and the word "iPod" to a vector [0.3, 0.9, 0.0], based on current parameter values, e.g., using a particular lookup table.

As another example, for a feature type whose features can potentially consist of a list of two or more tokens, the embedding function may be a parallel embedding function. A parallel embedding function maps each token in a list of tokens to a respective floating point vector and outputs a single vector that is the concatenation of the respective floating point vectors. For example, for an ordered list of tokens {"Atlanta", "Hotel"}, the parallel embedding function may map "Atlanta" to a vector [0.1, 0.2, 0.3] and "Hotel" to [0.4, 0.5, 0.6], and then output [0.1, 0.2, 0.3, 0.4, 0.5, 0.6]. In order to identify the respective floating point vectors, the parallel embedding function may use a single lookup table or multiple different look up tables.

As another example, for a feature type whose features can potentially consist of a list of two or more tokens, the embedding function may be a combining embedding function. A combining embedding function maps each token in the list to a respective floating point vector and then merges the respective floating point vectors into a single merged vector. The combining embedding function can merge the respective floating point vector using a linear function, e.g., a sum, average, or weighted linear combination of the respective floating point vectors, or using a nonlinear function, e.g., a component-wise maximum or a norm-constrained linear combination, for example. In order to identify the respective floating point vectors, the parallel embedding function may use a single look up table or multiple different look up tables. For example, for the ordered list {"Atlanta", "Hotel"}, the parallel embedding function may map "Atlanta" to a vector [0.1, 0.2, 0.3] and "Hotel" to [0.4, 0.5, 0.6], and then output the sum of the two vectors, i.e., [0.5, 0.7, 0.9].

As another example, for a feature type whose features can potentially consist of a list of two or more tokens, the embedding function may be a mixed embedding function. A mixed embedding function maps each token in a list of tokens to a respective floating point vector and generates an initial vector that is the concatenation of the respective floating point vectors. The mixed embedding function then merges the respective floating point vectors into a merged vector and concatenates the merged vector with the initial vector. For example, for the ordered list {"Atlanta", "Hotel"}, the mixed embedding function may output a concatenation of the vectors output by the parallel embedding function and the combining embedded function, i.e., [0.1, 0.2, 0.3, 0.4, 0.5, 0.6, 0.5, 0.7, 0.9].

Depending on the implementation, the system may utilize two different kinds of embedding functions for two different feature types, and the two embedding functions may or may not share parameters. For example, the system may utilize a combining embedding function for a first feature type and a mixed embedding function for a second feature type.

If one or more of the features are not discrete, prior to processing the feature using an embedding function, the system uses a hashing function to hash each non-discrete feature. The system can then partition each hashed feature into one of a pre-determined set of partitions, and process a value corresponding to the partition using the embedding function for the feature. Additionally, if a particular feature cannot be obtained, the system can map that feature to a pre-determined value.

In some implementations, instead of floating point values, a given embedding function may generate a different kind of numeric values. For example, the embedding function may generate quantized integer values whose encoding represents floating point values.

The system processes the floating-point vector representations using a deep network (step 206). The deep network can be, e.g., the deep network 108 of FIG. 1. The deep network includes multiple layers of non-linear transformations, with each transformation being defined based on values of a respective set of parameters. For example, the deep network can include one or more hidden neural network layers and a sparse binary output layer, e.g., a layer that outputs a vector that is 0 or 1 at every position. In general, the deep network generates an alternative representation of the input based on the floating-point vector representations of the features of the input.

The system processes the alternative representation of the input using a logistic regression classifier (step 208) to predict a label for the input. The logistic regression classifier predicts the input based on values of a set of parameters and the alternative representation. The label for the input is a prediction of the values of one or more binary variables, e.g., whether a user will select a given presentation of a given advertisement.

The process 200 can be performed to determine a label for an input for which the desired label is not known. The process 200 can also be performed on inputs in a set of training data, i.e., a set of inputs for which the label that should be predicted by the label is known, in order to train the system, i.e., to determine optimal values for the parameters of the logistic regression classifier, the deep network, and each of the embedding functions. For example, the process 200 can be performed repeatedly on inputs selected from a set of training data as part of a backpropagation training technique that determines optimal values for each of the parameters.

In some implementations, the deep learning system also includes a primary machine learning model. The primary machine learning model is a different machine learning model that has been trained to receive input features and generate an alternative representation of the input. In some implementations, the primary machine learning model does not include a deep network, i.e., is composed of only a single layer of linear computations.

Figure 3:
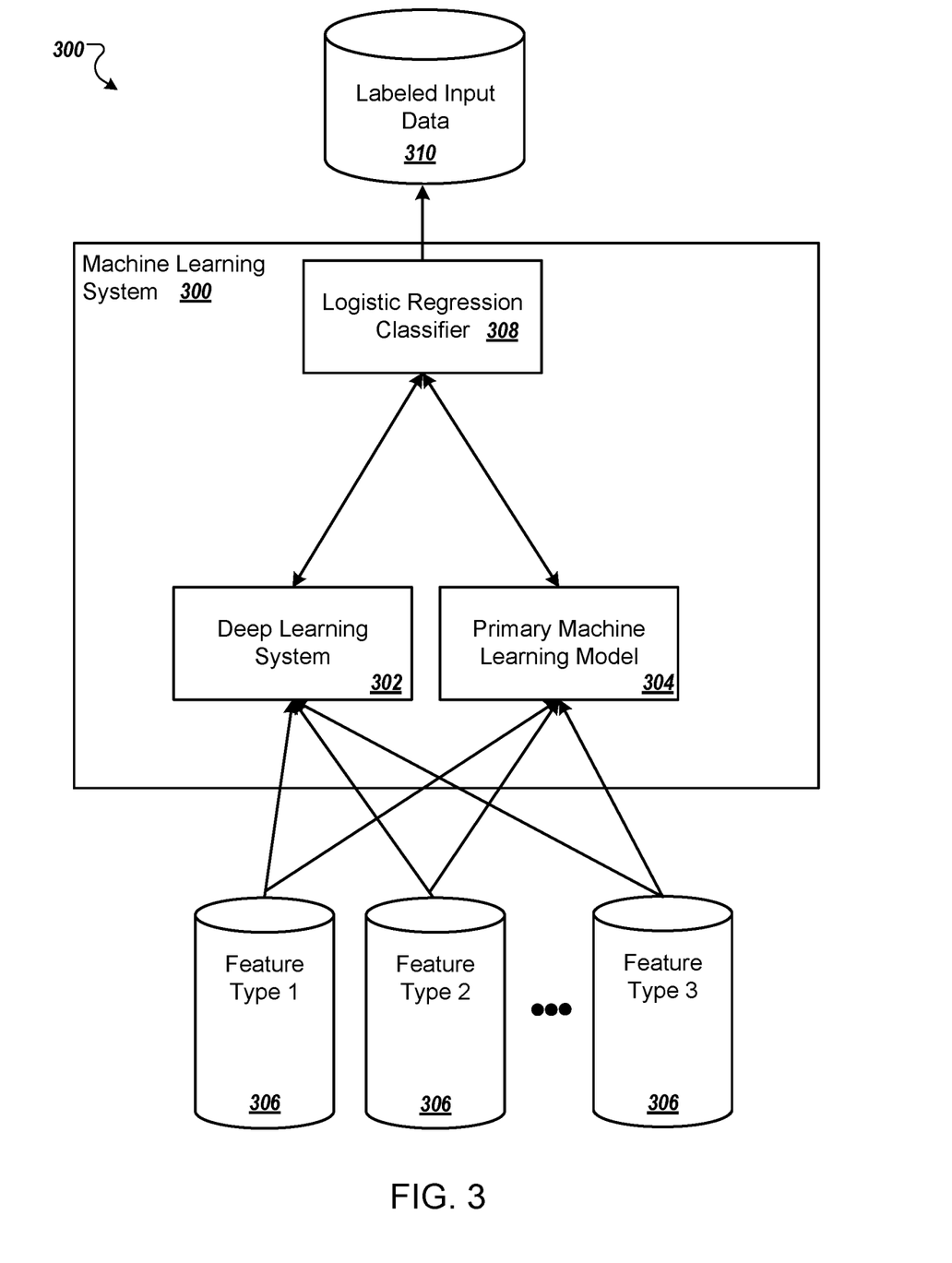
FIG. 3 is a block diagram of an example machine learning system.

FIG. 3 is a block diagram of an example machine learning system 300. The example machine learning system 300 includes a deep learning system 302 and a primary machine learning model 304. The deep learning system 302 includes a set of embedding functions, e.g., the embedding functions 106 of FIG. 1, a deep network, e.g., the deep network 108 of FIG. 1, and optionally a classifier, e.g., a logistic regression classifier, e.g., the logistic regression classifier 110 of FIG. 1. Each of the deep learning system 302 and the primary machine learning model 304 receives a set of features of an input, e.g., from feature type data stores 306, and generates an alternative representation of the input. The alternative representations of the input are then provided to the logistic regression classifier 308, which predicts a label for the input based on the outputs of the deep learning system 302 and the primary machine learning model 304.

The labeled input can be stored in a labeled input data store 310 for later use or used immediately.

The classifier 308 predicts the labels based in part on values of a set of parameters. The set of parameters include, for both the deep learning system 302 and the primary machine learning model 304, at least one respective parameter that defines weights that are applied to outputs received by the classifier from each. In implementations where one or more of the deep learning system 302 and the primary machine learning model 304 output predicted probabilities for the binary label values, the logistic regression classifier may operate on the log-odds transformed representations of the binary label values.

In some implementations, the logistic regression classifier 308 and the deep learning system 302 can be trained in order to improve upon the performance of the primary machine learning model 304, i.e., in order for the machine learning system 300 to predict more frequently a label for an input that matches the desired label for the input than would a machine learning system that did not include the deep learning system 302.

Figure 4:
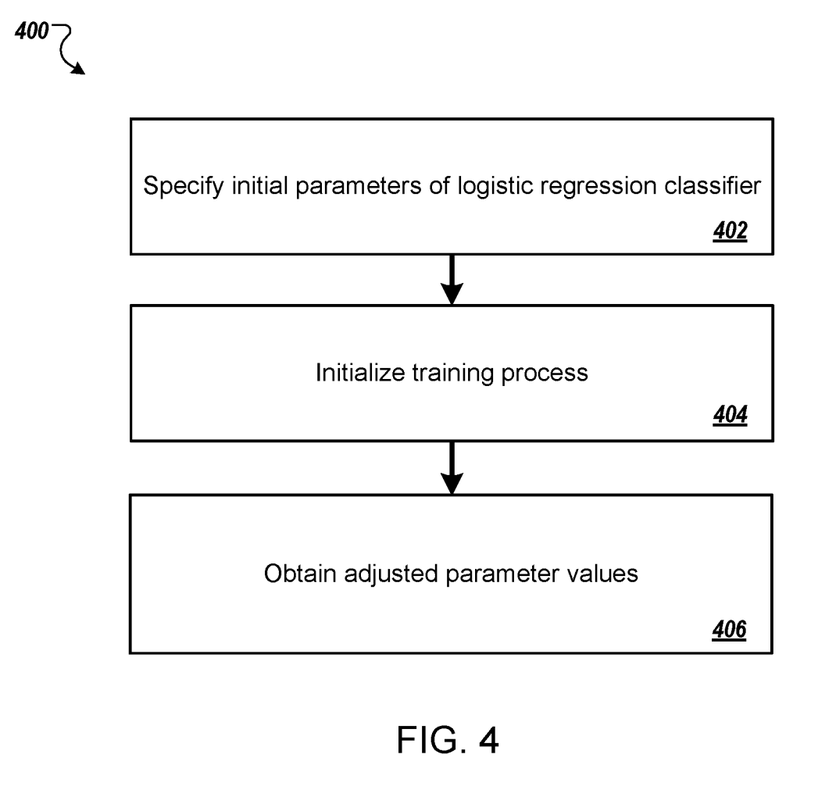
FIG. 4 is a flow diagram of an example process for training a machine learning system that includes a primary machine learning model.

FIG. 4 is a block diagram of an example process 400 for training a machine learning system that includes a primary machine learning model. For convenience, the process 400 will be described as being performed by a system of one or more computers located in one or more locations. For example, a machine learning system, e.g., the machine learning system 300 of FIG. 3, appropriately programmed, can perform the process 400.

The system specifies initial values for the parameters of a logistic regression classifier (step 402). In particular, the system assigns a value for the parameter that corresponds to the weight assigned to the output of a primary machine learning model, e.g., the primary machine learning model 304 of FIG. 3, to one, and the values of the one or more parameters that correspond to the weight assigned to the output of a deep network, e.g., the deep learning system 302 of FIG. 3, to zero. That is, the initial values are specified such that initially the label assigned by the classifier will depend only on the output of the primary machine learning model and not on the output of the deep network.

The system performs a training process to train the logistic regression classifier (step 404) using the specified initial values for the parameters and a set of training data. The set of training data includes a set of inputs, each having a respective set of input features, and for each input a label that should be predicted by the system. Additionally, the training process uses the method of backpropagation to adjust the parameters of all the components of a deep learning network that provides input to the logistic regression classifier in a direction that reduces expected error on the current training example. The deep learning network includes a deep network, e.g., the deep network 108 of FIG. 1, and a set of embedding functions, e.g., the embedding functions 106 of FIG. 1.

As part of the training process, if the label predicted by the logistic regression classifier for a particular input in the set of training data is different from the known desired label for that particular input, the logistic regression classifier will adjust its parameters so as to reduce the expected error on that particular input using conventional gradient based methods. Furthermore, through the method of backpropagation, the logistic regression classifier sends an error signal to the deep learning network, which allows it to adjust the parameters of its internal components, e.g., the deep network and the set of embedding functions though successive stages of backpropagation.

At the completion of the training process, the system obtains values of the parameters of the logistic regression classifier and the deep learning system (step 406) that have been adjusted during the training process to improve performance relative to the performance of the primary machine learning model.

While the above description describes implementations where the output of the deep learning system and the output of the primary machine learning model are both used as inputs into a logistic regression classifier, the output of the deep learning system can also be used as an input into the primary machine learning model. That is, the output of the deep learning system for a given input may be treated as an additional feature of the input and provided as an input feature to the primary machine learning model in addition to or instead of the existing features of the input. Alternatively or in addition, one or more of the representations of the input that are generated by the various components of the deep learning system can be used as an input into the primary machine learning model.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   receiving an input comprising a plurality of features, wherein each of the features is of a different feature type;
   processing each of the features using a respective embedding function to generate one or more respective numeric values, wherein each of the embedding functions operates independently of each of the other embedding functions, and wherein each of the embedding functions is specific to features of a respective feature type;
   processing the numeric values using a deep network to generate a first alternative representation of the input, wherein the deep network is a machine learning model composed of a plurality of levels of non-linear operations; and processing the first alternative representation of the input using an output layer generate a prediction for the input.

2. The method of claim 1, wherein the output layer is a sparse binary output layer.

3. The method of claim 1, wherein at least one of the features comprises one or more tokens.

4. The method of claim 1, wherein at least one of the features is a sparse feature.

5. The method of claim 1, wherein at least one of the embedding functions is a simple embedding function that maps a single token to a floating point vector.

6. The method of claim 1, wherein at least one of the embedding functions is a parallel embedding function that maps each token in a list of tokens to a respective floating point vector and outputs a single vector that is a concatenation of the respective numeric values.

7. The method of claim 1, wherein at least one of the embedding functions is a combining embedding function that maps each token in a list of tokens to a respective floating point vector and outputs a single merged vector that is a combination of the respective numeric values.

8. The method of claim 7, wherein the merged vector is an output of a predetermined linear or nonlinear function of the respective numeric values.

9. The method of claim 1, wherein at least one of the embedding functions is a mixed embedding function that maps each token in a list of tokens to a respective floating point vector, generates an initial vector that is a concatenation of the respective numeric values, merges the respective numeric values into a merged vector, and concatenates the merged vector with the initial vector to generate a final vector.

10. A system comprising one or more computers and one or more storage devices storing instructions that, when executed by the one or more computers, cause the one or more computers to perform operations comprising:

receiving an input comprising a plurality of features, wherein each of the features is of a different feature type;

processing each of the features using a respective embedding function to generate one or more respective numeric values, wherein each of the embedding functions operates independently of each of the other embedding functions, and wherein each of the embedding functions is specific to features of a respective feature type;

processing the numeric values using a deep network to generate a first alternative representation of the input, wherein the deep network is a machine learning model composed of a plurality of levels of non-linear operations; and processing the first alternative representation of the input using an output layer to generate a prediction for the input.

11. The system of claim 10, wherein the output layer is a sparse binary output layer.

12. The system of claim 10, wherein at least one of the features comprises one or more tokens.

13. The system of claim 10, wherein at least one of the features is a sparse feature.

14. The system of claim 10, wherein at least one of the embedding functions is a simple embedding function that maps a single token to a floating point vector.

15. The system of claim 10, wherein at least one of the embedding functions is a parallel embedding function that maps each token in a list of tokens to a respective floating point vector and outputs a single vector that is a concatenation of the respective numeric values.

16. The system of claim 10, wherein at least one of the embedding functions is a combining embedding function that maps each token in a list of tokens to a respective floating point vector and outputs a single merged vector that is a combination of the respective numeric values.

17. The system of claim 16, wherein the merged vector is an output of a predetermined linear or nonlinear function of the respective numeric values.

18. The system of claim 10, wherein at least one of the embedding functions is a mixed embedding function that maps each token in a list of tokens to a respective floating point vector, generates an initial vector that is a concatenation of the respective numeric values, merges the respective numeric values into a merged vector, and concatenates the merged vector with the initial vector to generate a final vector.

19. One or more non-transitory computer-readable storage media storing instructions that, when executed by one or more computers, cause the one or more computers to perform operations comprising:

receiving an input comprising a plurality of features, wherein each of the features is of a different feature type;

processing each of the features using a respective embedding function to generate one or more respective numeric values, wherein each of the embedding functions operates independently of each of the other embedding functions, and wherein each of the embedding functions is specific to features of a respective feature type;

processing the numeric values using a deep network to generate a first alternative representation of the input, wherein the deep network is a machine learning model composed of a plurality of levels of non-linear operations; and processing the first alternative representation of the input using an output layer to generate a prediction for the input.

20. The computer-readable storage media of claim 19, wherein the output layer is a sparse binary output layer.

* * * * *